United States Patent
Kim et al.

(10) Patent No.: US 8,431,216 B2
(45) Date of Patent: Apr. 30, 2013

(54) OPTICAL FILM FOR A DISPLAY DEVICE AND METHOD OF FABRICATING THE SAME

(75) Inventors: Jinho Kim, Gyeonggi-do (KR); Sangho Choi, Gyeonggi-do (KR); Junhee Lee, Gyeonggi-do (KR); Mikyung Park, Gyeonggi-do (KR); Sujung Park, Daegu (KR)

(73) Assignee: LG Display Co., Ltd., Seoul (KR)

( * ) Notice: Subject to any disclaimer, the term of this patent is extended or adjusted under 35 U.S.C. 154(b) by 956 days.

(21) Appl. No.: 12/149,514

(22) Filed: May 2, 2008

(65) Prior Publication Data

US 2008/0311407 A1    Dec. 18, 2008

(30) Foreign Application Priority Data

May 5, 2007   (KR) .................. 10-2007-0043826
Jul. 18, 2007  (KR) .................. 10-2007-0071527
Dec. 31, 2007  (KR) .................. 10-2007-0141368

(51) Int. Cl.
*B32B 27/20*   (2006.01)
*B32B 27/30*   (2006.01)
*B32B 33/00*   (2006.01)

(52) U.S. Cl.
USPC ............ 428/323; 428/331; 428/421; 428/522

(58) Field of Classification Search .................. None
See application file for complete search history.

(56) References Cited

U.S. PATENT DOCUMENTS

| 5,597,874 | A  | * | 1/1997 | Anton et al. | ................ | 525/331.2 |
| 5,736,602 | A  | * | 4/1998 | Crocker et al. | ................ | 524/494 |
| 6,511,721 | B1 |   | 1/2003 | Murata et al. | | |
| 6,632,508 | B1 | * | 10/2003 | Pellerite et al. | ................ | 428/142 |
| 2005/0038137 | A1 | | 2/2005 | Yoshihara et al. | | |
| 2006/0147729 | A1 | | 7/2006 | Mizuno | | |

FOREIGN PATENT DOCUMENTS

| CN | 1464861 A | 12/2003 |
| CN | 1914523 A | 2/2007 |
| CN | 1942545 A | 4/2007 |
| JP | 2003-270633 A | 9/2003 |
| KR | 10-2006-0014436 | 2/2006 |
| WO | WO 2006/022427 A1 | 3/2006 |
| WO | 2006083311 A2 | 8/2006 |
| WO | WO 2007/043301 A1 | 4/2007 |

OTHER PUBLICATIONS

Communication from the European Patent Office dated Jan. 26, 2012 in counterpart EPO application.

* cited by examiner

*Primary Examiner* — Ramsey Zacharia
(74) *Attorney, Agent, or Firm* — Morgan, Lewis & Bockius LLP

(57) ABSTRACT

An optical film for a display device including a substrate and a coating layer in which a first material has a first range of surface energy value and a second material has a second range of surface energy value smaller than the first range of surface energy value such that the first material is mainly distributed on a first side of the coating layer contacting the substrate and the second material is mainly distributed on a second side of the coating layer opposite to the first side.

9 Claims, 10 Drawing Sheets

HEAT OR LIGHT

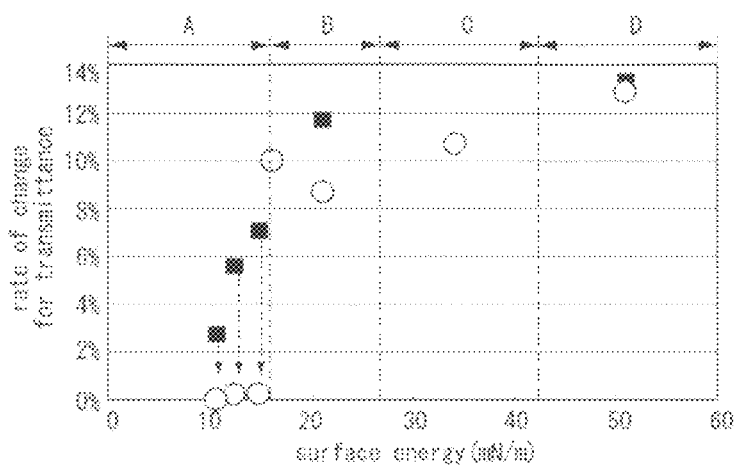

OPTICAL FILM FOR A DISPLAY DEVICE AND METHOD OF FABRICATING THE SAME

This non-provisional application claims priority under 35 U.S.C. §119(a) on Patent Application No. 10-2007-0043826, 10-2007-0071527 and 10-2007-0141368 filed in the Republic of Korea on May 5, 2007, Jul. 18, 2007 and Dec. 31, 2007 respectively, the entire contents of all of which are hereby incorporated by reference in their entirety.

BACKGROUND OF THE INVENTION

1. Field of the Invention

This document relates to a display device, and more particularly, to an optical film for a display device and a method for fabricating the same. Although embodiments of the invention are suitable for a wide scope of applications, it is particularly suitable for improving anti-scratch, anti-fouling and anti-reflection characteristics.

2. Discussion of the Related Art

Display devices, such as a plasma display panel (PDP), an electroluminescent display (ELD), a liquid crystal display (LCD), and the like, have received much attention because of their fast response speed, low power consumption, and high color reproduction rate. Such display devices are employed for diverse home appliances including TVs, computer monitors, notebook computers, mobile phones, displays of refrigerators, and the like. In particular, recently, display devices, such as personal digital assistants (PDAs), automated teller machines (ATMs), and the like, allowing the input of information by using touch screens, are now being commonly used.

In display devices, an optical film, such as an anti-glare film, a polarizer, a prism sheet and the like, are attached to a backlight unit or a display panel to prevent degradation of the contrast caused by transmission and reflection of external light, prevent reflection of an image, and to protect the screen. In particular, for a display device having a function of inputting information by directly contacting the user's hand or a stylus pen on the surface of the display device, the necessity of an optical film that can have high resistance to fingerprints or blurs due to a touch of the user's hand or the stylus pen or that can have the characteristics of being able to remove fingerprints or blurs, namely, anti-fouling characteristics, have been raised.

In the related art, an acrylic polymer material having a relatively high surface energy (about 40 mN/m~50 mN/m) is positioned on a screen of the display device. Therefore, the acrylic polymer material strongly interacts with contaminants (namely, it strongly attracts contaminants) so as to easily attach the contaminants on the screen. When the contaminants attach to the acrylic polymer material on the screen, it is very difficult to wipe the contaminants from the screen, and the screen can be scratched by the contaminants while trying to wipe the screen. Also, because prism sheet utilized in a backlight unit has the shapes of peak portion and valley portion, the peak portion can be easily broken or abraded by an exterior force.

SUMMARY OF THE INVENTION

Accordingly, embodiments of the invention is directed to an optical film for a display device and a method for fabricating the same that substantially obviates one or more of the problems due to limitations and disadvantages of the related art.

An object of embodiments of the invention is to provide an optical film for a display device that can be simply fabricated and have anti-fouling characteristics.

An object of embodiments of the invention is to provide an optical film for a display device that can be simply fabricated and have both anti-scratch and anti-fouling characteristics.

An object of embodiments of the invention is to provide an optical film for a display device that can be simply fabricated and have both anti-fouling and anti-reflection characteristics.

An object of embodiments of the invention is to provide an optical film for a display device that can be simply fabricated as well as have anti-scratch, anti-fouling, and anti-reflection characteristics.

An object of embodiments of the invention is to provide an optical film for a display device that can be simply fabricated as well as have anti-fouling, anti-static and anti-reflection characteristics.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, an optical film for a display device includes a substrate and a coating layer in which a first material has a first range of surface energy value and a second material has a second range of surface energy value smaller than the first range of surface energy value such that the first material is mainly distributed on a first side of the coating layer contacting the substrate and the second material is mainly distributed on a second side of the coating layer opposite to the first side.

In another aspect, the optical film for a display device includes a substrate and a coating layer in which a polar material and non-polar material are combined such that the polar material is mainly distributed on a first side of the coating layer contacting the substrate and the non-polar material is mainly distributed on a second side of the coating layer opposite to the first side.

In another aspect, the method for fabricating an optical film includes: adding a polymerization initiator to one of monomer and oligomer to form a polymer resin; mixing the polymer resin with at least one of fluorine and silicon-containing compounds to obtain a coating solution; and providing the coating solution onto a substrate such that the polymer resin moves toward the substrate while the at least one of fluorine and silicon-containing compounds moves away from the substrate to cause phase separation.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

FIG. 15 is a graph showing the results obtained by performing anti-fouling test for the optical film after intentionally attaching contaminants on the optical film; and FIG. 16 is a view showing a table of test results obtained by performing anti-fouling test for the optical film according to embodiments of the invention and the related art optical samples.

DETAILED DESCRIPTION OF THE PREFERRED EMBODIMENTS

Figure 1:
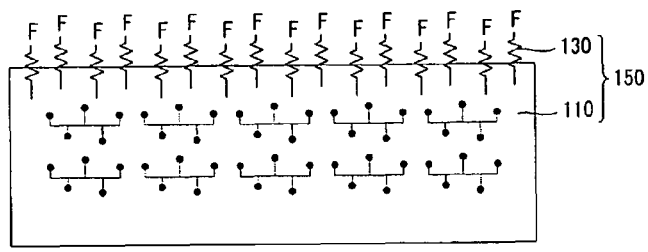
FIG. 1 is a sectional view showing an optical film according to embodiments of the invention.

Embodiments of the invention are based on recognition that a contact angle and surface energy of an optical film maintain sufficient anti-fouling and anti-reflection characteristics of the optical film. In particular, because the optical film is attached on the uppermost portion of a display screen, an attached face of the optical film should have such a high surface energy so as not to come off the display screen in use while an exposed face of the optical film should have such a low surface energy as to prevent contaminants from being attached thereto. That is, if a surface energy of a certain material is high, its attraction increases to strengthen absorption characteristics with a different material and if the surface energy is low, its attraction decreases to weaken the absorption characteristics with a different material. Thus, the exposed face of the optical film is set to have a low surface energy while the attached face is set to have a high surface energy. For this purpose, the related art optical film has a dual-layer structure in which a material with a high surface energy is attached to one side and a material with a low surface energy is attached to the other side, for use.

In contrast, embodiments of the invention provide a single layer optical film which can be formed at one time by mixing two materials, each of the two materials has a different surface energy in a solid state contact angle or polarity, in a liquid phase and coating the resultant material on a target material without undergoing an additional processes of attaching two films such that the fabrication process can be simplified and the optical film can have good anti-scratch, anti-fouling, and contaminant removal characteristics. Namely, embodiments of the invention recognize that a phase-separation effect and anti-scratch, anti-fouling and contaminant removal characteristics differ depending on a difference between surface energy values, a difference between contact angles in a solid state or a difference between polarities of two materials constituting the optical film. Factors used for the effective phase separation in embodiments of the invention are as follows. The optical film according to the embodiments of the invention can be applied to or a part of a variety of appliances, in particular, to a display screen, an anti-glare film, an anti-reflection film, a polarizer or a prism sheet in display device. Hereinafter, the features of the optical film according to the embodiments of the invention are described in detail.

1. Difference Between Surface Energy Values of the Two Materials

If two materials, each of them having a different surface energy value, are mixed, a material with a higher surface energy tends to move toward a contact face of the optical film, while a material with a lower surface energy tends to move toward an exposed face that contacts with air. The inventors of embodiments of the invention discovered that the highest phase separation effect can be obtained when the difference between the surface energy values of the two materials is in the range of 5 mN/m to 35 mN/m. Table 1 shows the surface energy values in case that an acrylic material is used as a first material having the relatively higher surface energy and a fluorine-based material is used as a second material having the relatively lower surface energy.

TABLE 1

| Materials | Surface energy (mil/m) |
|---|---|
| Fluorine-based polymer | |
| —$CF_3$ | 14.5 |
| —$CF_2H$ | 26.5 |
| —$CF_3$ and —$CF_2$— | 17.0 |
| —$CF_2$ | 22.0 |
| —$CH_2CF_3$ | 22.5 |
| Acrylic polymer | |
| Ethyl acrylate polymer | 40.1 |
| Ketyl acrylate polymer | 37.0 |
| Butyl acrylate polymer | 33.7 |
| Ethyl hexyl acrylate polymer | 30.2 |

2. Difference Between Contact Angle Values of the Two Materials in a Solid State The most effective anti-fouling and contaminant removal characteristics can be obtained when a difference value between contact angles of the two materials constituting the optical film in the sold state is within the range of about 10° to 80°. In particular, it is possible to obtain the optical film having an improved anti-scratch, anti-fouling and contaminant removal characteristics when the contact angle of acryl-based material is in range of 50° to 90° and the contact angle of fluoro-based material is in range of 100° to 130°.

3. Difference Between Polarities of the Two Materials

When two materials, each having a different polarity, are mixed, because they are thermodynamically unstable, phase separation occurs at the interface of the two materials. In embodiments of the invention, the optical film is configured to have a mixture layer formed by mixing a first material having a high polarity and a second material having a high non-polarity, in which the first material is mainly distributed to the contact face and the second material is mainly distributed onto the exposed face.

In embodiments of the invention, the first material having a high polarity can include a material containing hydroxyl (—OH) groups, and the second material having a high non-polarity can include a material containing fluorocarbon (—CF) groups.

The foregoing and other objects, features, aspects and advantages of embodiments of the invention will become more apparent from the following detailed description of the embodiments of the invention when taken in conjunction with the accompanying drawings. Throughout the specification, like numerals refer to like elements.

The embodiments of the invention will now be described with reference to the accompanying drawings.

FIG. 1 is a sectional view showing an optical film according to embodiments of the invention. With reference to FIG. 1, an optical film 150 is formed as a mixture layer in which a first material 110 has a first range of surface energy value and a second material 130 has a second range of surface energy value smaller than the first range of surface energy value. In the mixture layer, the first material 110 is mainly distributed to the side of the mixture layer that contacts with a screen of a display device and the second material 130 is mainly distributed onto the side of the exposed face.

In embodiments of the invention, the difference between the surface energy values of the first and second materials 110 and 130 can range from about 5 mN/m to 35 mN/m. Specifically, the first material 110 can contain a polymer resin having a surface energy value in the range of 30 mN/m to 45 mN/m, and the second material 130 can contain one of fluorine-based polymer, silicon-based polymer, and fluorine-silicon-based polymer having a surface energy value in the range of 10 mN/m to 25 mN/m. The fluorine-silicon component is combined with other materials to increase hardness of the compound and decrease the surface energy of the compound. As a result, the optical film according to embodiments of the invention can have the improved anti-scratch that sufficiently tolerates scratches caused by an external pressure, anti-fouling and anti-reflection. FIGS. 2a to 2e are views for explaining a fabrication process of the optical film according to embodiments of the invention.

Figure 2A:
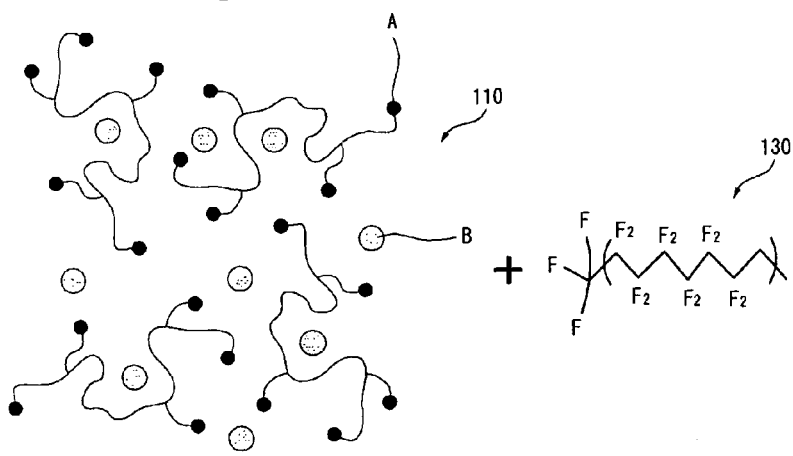
FIGS. 2a to 2e are views for explaining a fabrication process of the optical film according to embodiments of the invention.

First, to fabricate the optical film 150, as shown in FIG. 2a, a polymerization initiator (B) is added to monomers or oligomers (A) to form the polymer resin 110.

The monomers or oligomers (A) can be photopolymerizable monomers or oligomers or thermopolymerizable monomers or oligomers, or can be monomers or oligomers for forming tri-acetyl-cellulose (TAC), polyester (PE), polyethylene terephthalate (PET), polyethylene naphthalate (PEN), aligned polypropylene (PP), polycarbonate (PC), an acrylic resin, a urethane-based resin, an epoxy resin, a melamine resin, or a silicon resin. For example, styrene-based monomers, such as styrene or α methylstyrene, acrylate monomers and acrylate oligomers can be used. More specifically, the acrylate monomers can include various types of (meta) acrylate monomers, such as apolyestere (meta) acrylate, epoxy (meta) acrylate, urethane (meta) acrylate, polyether (meta) acrylate, polyol (meta) acrylate, and melamine (meta) acrylate. The acrylate oligomers can include urethane acrylate oligomers and epoxy acrylate oligomers. However, the monomers and oligomers are not limited to those mentioned above. The polymer resin 110 can be a photocurable resin or a thermosetting resin, such as tri-acetyl-cellulose (TAC), polyester (PE), polyethylene terephthalate (PET), polyethylene naphthalate (PEN), aligned polypropylene (PP), polycarbonate (PC), an acrylic resin, a urethane-based resin, an epoxy-based resin, a melamine-based resin, or silicon-based resin, but not limited thereto.

The polymerization initiator (B) can include a photo radical polymerization initiator, such as aceto phenone species, benzo phenone species, benzoin, benzyl methyl ketal, Michler's ketone, benzoil benzoate, thioxanthone species, or α-acyloxymester, or a photocatonic polymerization initiator, such as onium salt, sulfonic acid ester, or an organic metal adhesive. However, the polymerization initiator is not limited thereto, and various other types of polymerization initiators can alternatively be used.

Next, the polymer resin 110 and the fluorine and/or silicon-containing compounds 130 are mixed to obtain a coating solution. Here, the fluorine and/or silicon-containing compounds 130 can include one of a fluorine-containing compound, a silicon-containing compound, and a fluorine-silicon-containing compound. The fluorine and/or silicon-containing compounds 130 can include compounds containing perfluoro polyether groups or alcoxy silane groups, but is not limited thereto.

Although not shown, the coating solution can contain inorganic particles, such as silica particles, nano-silica particles, conductor particles, or nano-conductor particles according to various uses.

Figure 2B:
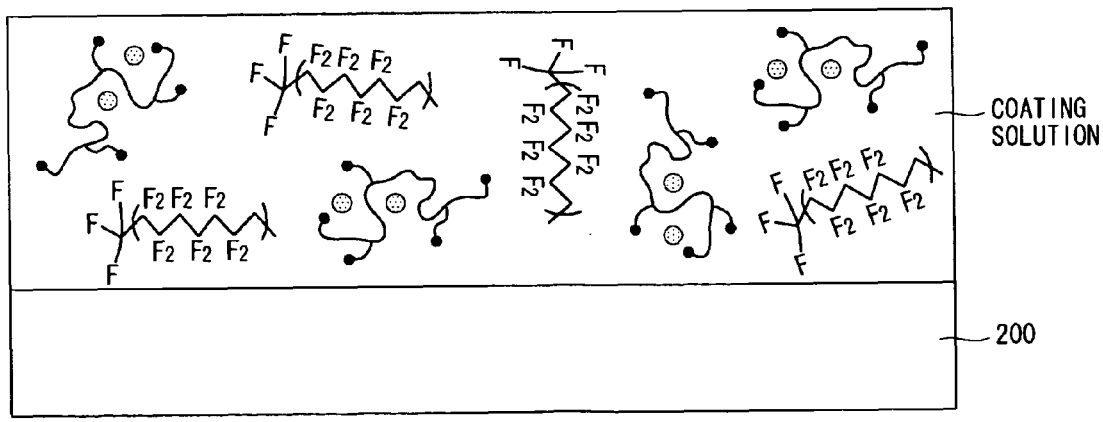
Figure 2C:
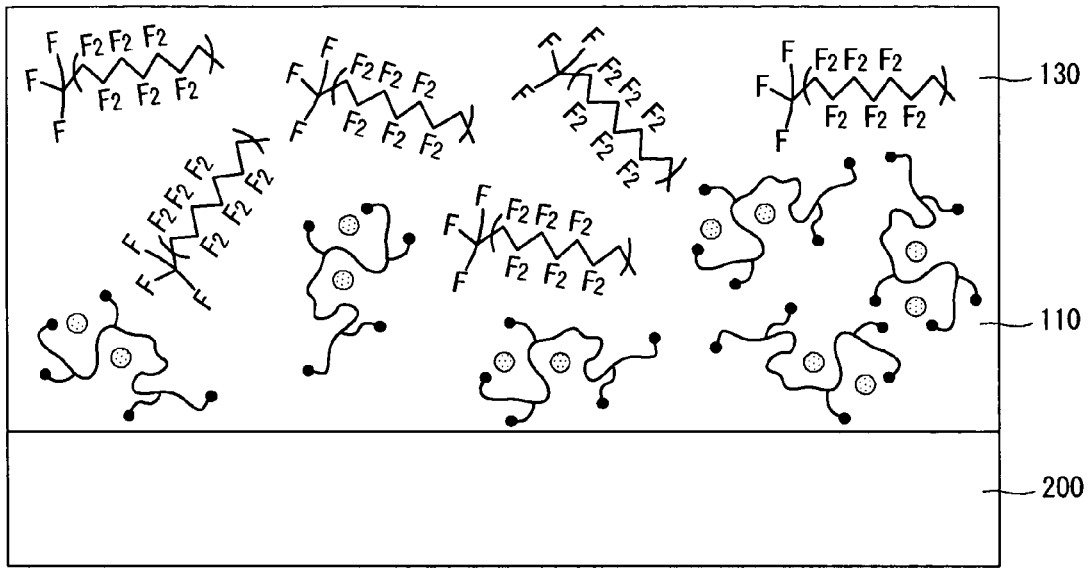

With reference to FIGS. 2b and 2c, the coating solution obtained as described above is coated on a substrate 200. Then, the polymer resin 110 having a higher surface energy moves toward the contact face that contacts with the substrate 200, while the fluorine and/or silicon-containing compounds 130 having a lower surface energy moves toward the exposed face that does not contact with the substrate 200 but contacts with air, causing phase separation. Namely, the fluorine and/or silicon-containing compounds 130 of the coating solution have a lower surface energy and become more stable when positioned at the surface layer, relatively higher than the monomers or oligomers (A). Accordingly, as the monomers or oligomers (A) are polymerized by the polymerization initiator (B), the fluorine and/or silicon-containing compounds 130 having the smaller surface energy voluntarily move toward an upper surface layer (i.e., surface), causing phase separation.

In embodiments of the invention, the polymer resin 110 can have a surface energy value ranging from 30 mN/M to 45 mN/m, and the fluorine and/or silicon-containing compounds 130 can have a surface energy value ranging from 10 mN/m to 25 mN/m. A lower surface layer (i.e., an inner surface or a bulk layer), which has relatively less fluorine and/or silicon-containing compounds 130 and relatively more polymer resin 110, can have stylus hardness characteristics of more than 'H', preferably, by 2H, to sufficiently endure a touch by the user's hand or a stylus pen.

Figure 2D:
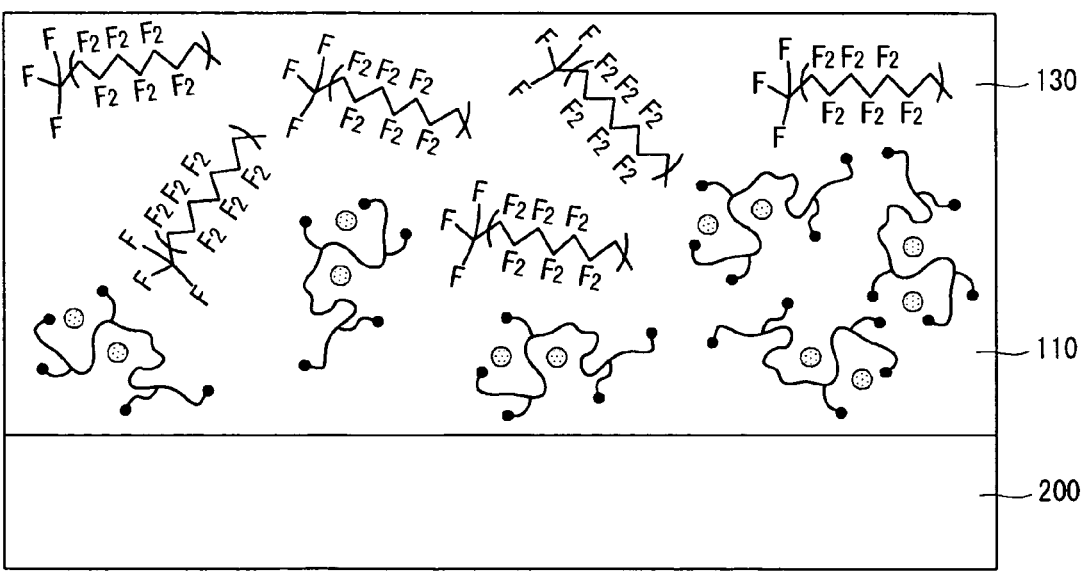
Figure 2E:
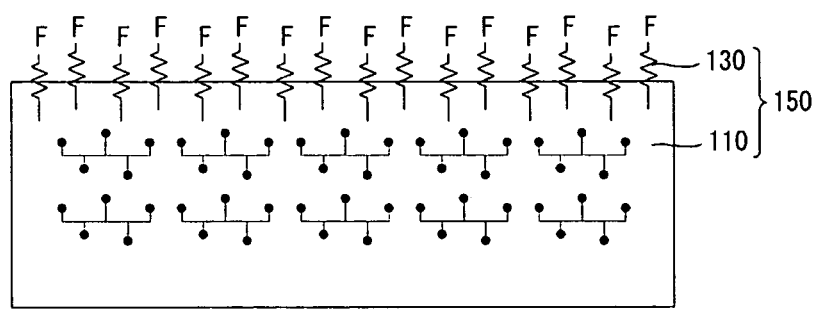

Thereafter, with reference to FIGS. 2d and 2e, heat or light is applied to the coating solution coated on the substrate 200 to harden the coating solution to obtain an optical film including a coating layer 150 and the substrate 200, as shown in FIG. 2e.

Although not shown, a process for making the optical film according to embodiments of the invention having a concavo-convex (depressed and embossed) surface can be additionally performed.

According to embodiments of the invention as described above, because the optical film is fabricated by simply mixing two materials each having a different surface energy and hardening them, without performing a process for attaching the two materials, the fabrication process can be simplified. In addition, the fluorine and/or silicon-containing compounds 130 positioned at the exposed face of the coating layer 150 have a smaller surface energy and a low refractive index. Thus, the coating layer 150 according to embodiments of the invention can have the improved anti-scratch that sufficiently tolerates scratches caused by an external pressure, anti-fouling and anti-reflection characteristics.

Figure 3:
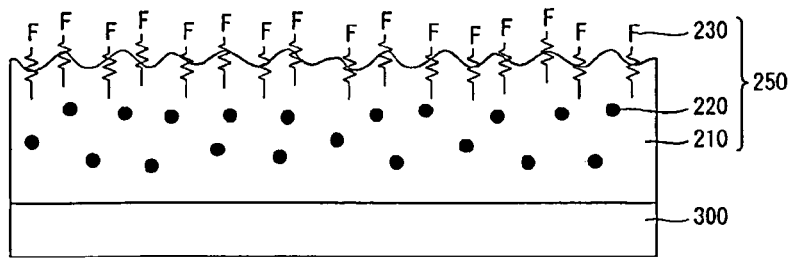
FIG. 3 is a sectional view showing an optical film according to a first embodiment of the invention.

FIG. 3 is a sectional view showing an optical film according to a first embodiment of the invention. With reference to FIG. 3, the optical film according to the first embodiment of the invention includes a coating layer 250 formed on a base layer 300. The base layer 300 has a high transmittance, a relatively low birefringence, and can be made of a material that can be easily hydrophilized by surface modification. For example, the base layer 300 can include tri-acetyl-cellulose (TAC) or polyester (PE), polyethylene terephthalate (PET), polyethylene naphthalate (PEN), aligned polypropylene (PP), polycarbonate (PC), etc., but not limited thereto. The base layer 300 can have a thickness of about 30 μm to 300 μm to have a sufficient strength.

The coating layer 250 is positioned on the base layer 300. Here, the coating layer 250 can be an AG (Anti-Glare) film. The coating layer 250 can include a polymer resin 210, silica particles 220, and fluorine and/or silicon-containing compounds 230, and can have a concavo-convex (irregular, non-uniform) surface. In this case, inorganic particles, such as nano-silica particles, can be used instead of the silica particles. The density of the fluorine and/or silicon-containing compounds 230 of an upper surface layer (i.e., a surface) of the coating layer 250 that contacts with the base layer 300 is higher than that of the fluorine and/or silicon-containing compounds 230 of a lower surface layer (i.e., an inner surface layer or a bulk layer) of the coating layer 250. Thus, the optical film according to the first embodiment of the invention can have excellent anti-scratch, anti-fouling and anti-reflection characteristics.

Figure 4:
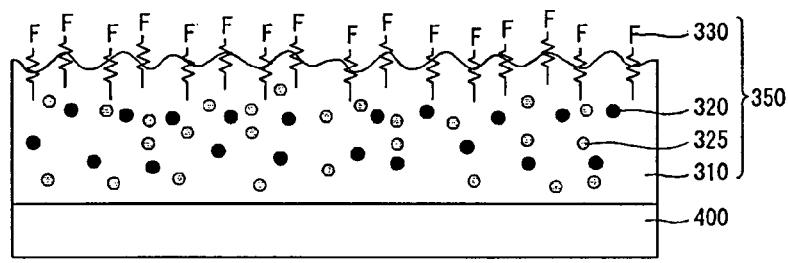
FIG. 4 is a sectional view showing an optical film according to a second embodiment of the invention.

FIG. 4 is a sectional view showing an optical film according to a second embodiment of the invention. With reference to FIG. 4, the optical film according to the second embodiment of the invention includes a coating layer 350 formed on a base layer 400. The coating layer 350 can be an AG/AS (Anti-Glare/Anti-Static) film including a polymer resin 310, silica particles 320, conductor particles 325, and fluorine and/or silicon-containing compounds 330 and can have a concavo-convex surface. In this case, inorganic particles, such as nano-silica particles, can be used instead of the silica particles, and inorganic particles, such as nano-conductor particles, can be used instead of conductor particles. The density of the fluorine and/or silicon-containing compounds 330 of an upper surface layer of the coating layer 350 that contacts with the base layer 400 is higher than that of the fluorine and/or silicon-containing compounds 330 of a lower surface layer of the coating layer 350. Thus, the optical film according to the second embodiment of the invention can have excellent anti-scratch, anti-fouling, anti-static and anti-reflection characteristics.

Figure 5:
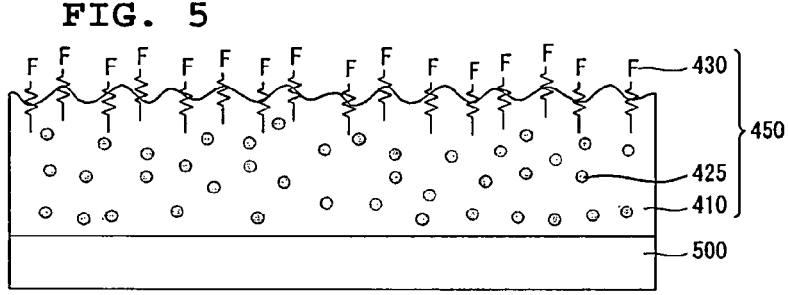
FIG. 5 is a sectional view showing an optical film according to a third embodiment of the invention.

FIG. 5 is a sectional view showing an optical film according to a third embodiment of the invention. With reference to FIG. 5, the optical film according to the third embodiment of the invention includes a coating layer 450 formed on a base layer 500. The coating layer 450 can be an HC/AS (Hard-Coating/Anti-Static) film including a polymer resin 410, conductor particles 425, and fluorine and/or silicon-containing compounds 430. The density of the fluorine and/or silicon-containing compounds 430 of an upper surface layer of the coating layer 450 that contacts with the base layer 500 is higher than that of the fluorine and/or silicon-containing compounds 430 of a lower surface layer of the coating layer 450. Thus, the optical film according to the third embodiment of the invention can have the excellent anti-scratch, anti-fouling, and anti-static characteristics.

Figure 6:
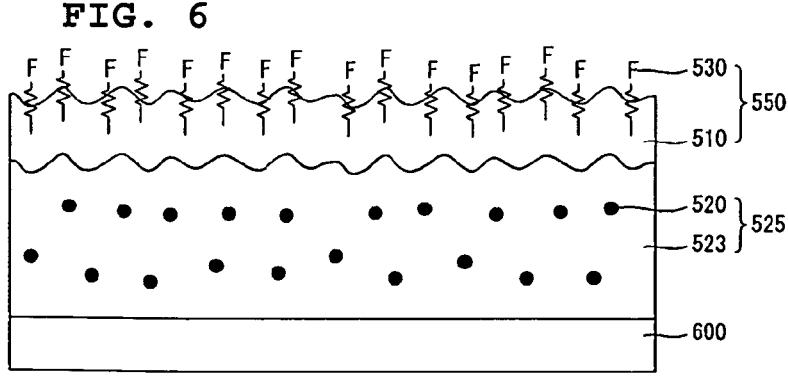
FIG. 6 is a sectional view showing an optical film according to a fourth embodiment of the invention.

FIG. 6 is a sectional view showing an optical film according to a fourth embodiment of the invention. With reference to FIG. 6, the optical film according to the fourth embodiment of the invention includes a first coating layer 525 and a second coating layer 550 formed on a base layer 600. The first coating layer 525 can include silica particles 520 and a polymer resin 523 and can be an AG film having a concavo-convex surface. The second coating layer 550 can be a HR (High Reflective) film having a high refractive index.

The second coating layer 550 can include a polymer resin 510 and a fluorine and/or silicon-containing compounds 530. The polymer resin 510 can be formed to have a high refractive index by polymerizing monomers of high refractive index, for example, bis (4-metacrylo il thiophenyl) sulfide, vinyl naphthalene, vinyl phenyl sulfide, and 4-metacryl oxyphenyl-4'-methoxy phenyl thioether. The layer of high-refractive index can include inorganic particles, such as $ZrO_2$ or $TiO_2$.

The second coating layer 550 includes a polymer resin 510 having a high refractive index and fluorine and/or silicon-containing compounds 530 having a low refractive index. The density of the fluorine and/or silicon-containing compounds 530 of an upper surface layer of the second coating layer 550 that contacts with the first coating layer 525 is higher than that of the fluorine and/or silicon-containing compounds 530 of a lower surface layer of the second coating layer 550. Here, the high refractive index and the low refractive index are determined on the basis of the base layer 500. Thus, the optical film according to the fourth embodiment of the invention can have the excellent anti-scratch, anti-reflection and anti-fouling characteristics.

Figure 7:
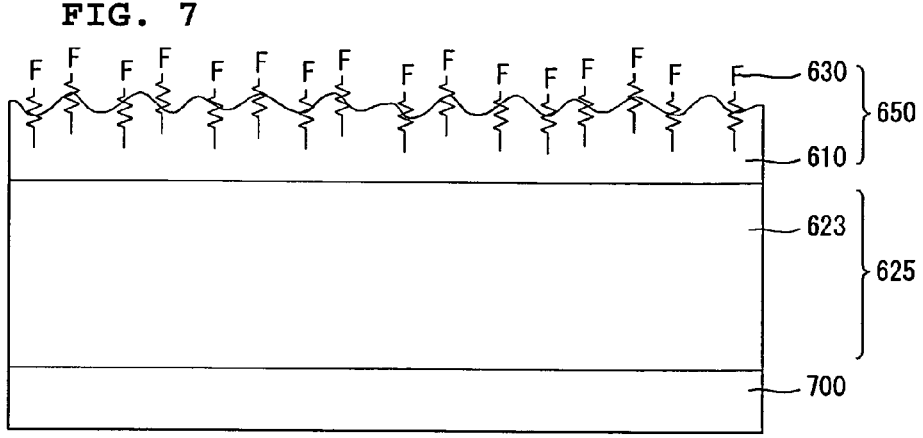
FIG. 7 is a sectional view showing an optical film according to a fifth embodiment of the invention.

FIG. 7 is a sectional view showing an optical film according to a fifth embodiment of the invention. With reference to FIG. 7, the optical film according to the fifth embodiment of the invention includes a first coating layer 625 as an HC (hard coating) film, and a second coating layer 650 as an HR (high reflection) film formed on a base layer 700. The first coating layer 625 can include a polymer resin 623, and the second coating layer 650 can include a polymer resin 610 having a high refractive index and a fluorine and/or silicon-containing compounds 630 having a low refractive index.

The density of the fluorine and/or silicon-containing compounds 630 of an upper surface layer of the second coating layer 650 that contacts with the first coating layer 625 is higher than that of the fluorine and/or silicon-containing compounds 630 of a lower surface layer of the second coating layer 650. Here, the high refractive index and the low refractive index are determined on the basis of the base layer 600. Thus, the optical film according to the fifth embodiment of the invention can have the excellent anti-scratch, anti-fouling, and anti-reflection characteristics.

Figure 8:
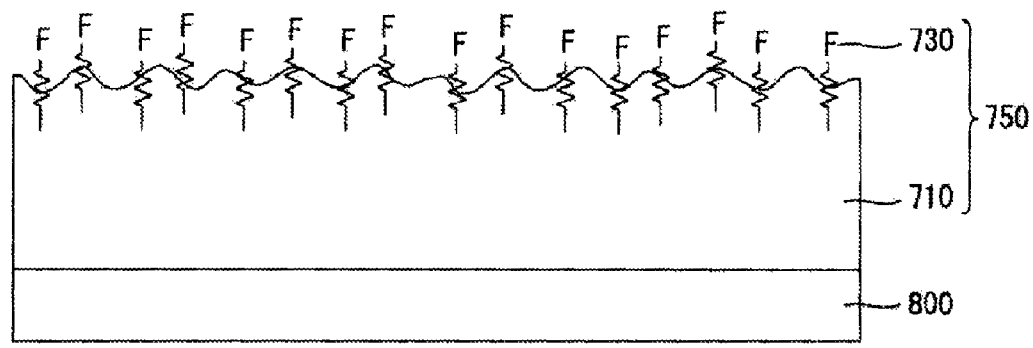
FIG. 8 is a sectional view showing an optical film according to a sixth embodiment of the invention.

FIG. 8 is a sectional view showing an optical film according to a sixth embodiment of the invention. With reference to FIG. 8, the optical film according to the sixth embodiment of the invention includes a coating layer 750 formed on a base layer 800. The coating layer 750 can be an HR film comprising a polymer resin 710 and fluorine and/or silicon-containing compounds 730 and can have a concavo-convex surface. The density of the fluorine and/or silicon-containing compounds 730 of an upper surface layer of the coating layer 750 that contacts with the base layer 800 is higher than that of the fluorine and/or silicon-containing compounds 730 of a lower surface layer of the coating layer 750. Thus, the optical film according to the sixth embodiment of the invention can have the excellent anti-scratch, anti-fouling and anti-reflection characteristics.

Base layers to be used in the embodiments as described above can be one of a diffusion sheet, polarizer, display screen and a layer of a prism sheet.

Besides the embodiments as described above, a polarizer can be configured to include a base film, a polarization film, and a second base film. Here, the first base film can be a TAC (Tri-Acetyl-Cellulose) film, and the polarization film can include polyvinyl alcohol. The second base film can include TAC and fluorine and/or silicon-containing compounds. The density of the fluorine and/or silicon-containing compounds of an upper surface layer of the second base film that contacts with the polarization film is higher than that of the fluorine and/or silicon-containing compounds of a lower surface layer of the second base film. Thus, the polarizer with such configuration can have excellent anti-scratch, anti-fouling, and anti-reflection characteristics.

The polarizers and optical films according to the embodiments of the invention can be attached to panels of display devices, such as a PDP, an ELD, or an LCD. The display devices employing such polarizers and optical films have improved anti-scratch, anti-static, anti-fouling, and anti-reflection characteristics.

Figure 9A:
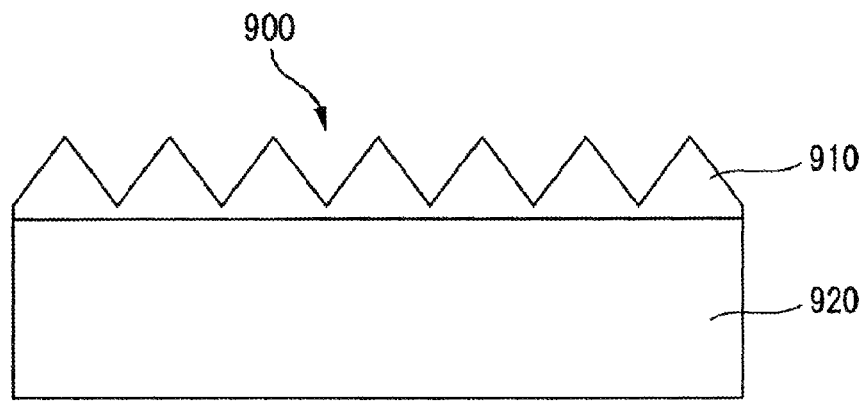
FIGS. 9A and 9B are sectional views showing a prism sheet according to according to embodiments of the invention.
Figure 9B:
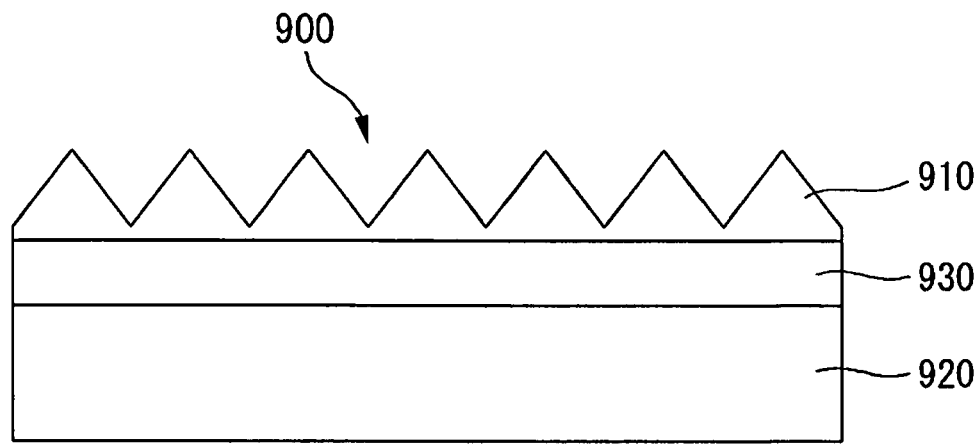

FIGS. 9A and 9B are sectional views showing a prism sheet according to embodiments of the invention. With reference to FIG. 9A, the prism sheet includes a base portion 920 and a prism portion 910 formed on the base portion 920. The base portion 920 includes a PET but not limited thereto. PET belongs to the strongest film among plastic resins, has superior electrical properties, and can be used as a very thin film. Further, it is very adapted for PET to be used as the prism sheet because PET has a very superior heat-resistance and transparence properties. The thickness of the base portion 920 can have a range from 120 μm to 140 μm. The base portion 920 can support the prism portion 910.

The prism portion 910 is disposed on the base portion 920, is prepared by the same method as that of the coating layer 150 as shown in FIGS. 2a to 2e. Therefore, the detailed description thereof is omitted to avoid repeated description.

FIG. 9B is a sectional view showing the prism sheet having a supporting portion 930 disposed between the base portion 920 and the prism portion 910. The supporting portion 930 supports the prism portion. The above-mentioned prism sheet 900 can be applied to a backlight unit of a display device.

Figure 10:
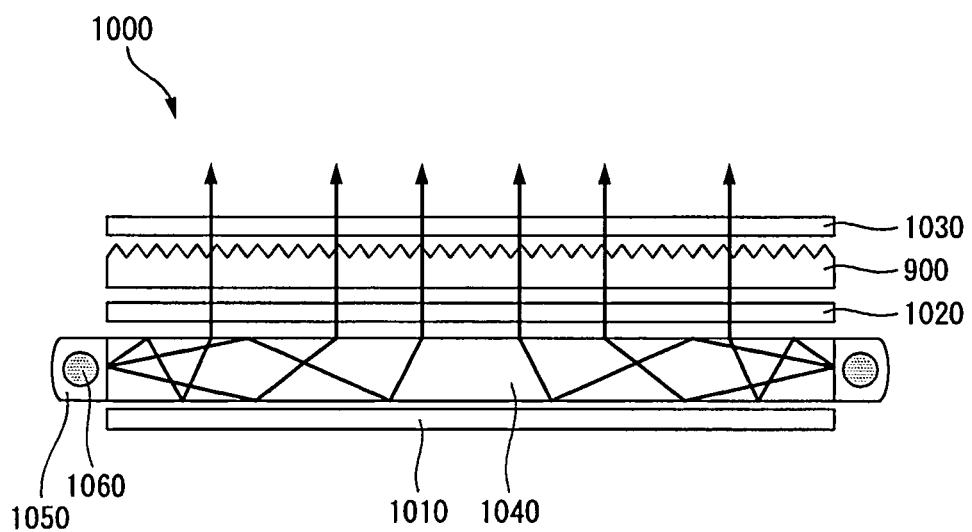
FIG. 10 is a sectional view showing a backlight unit having the prism sheets of FIGS. 9A and 9B.

FIG. 10 is a sectional view of a backlight unit having the prism sheet according to embodiments of the invention. In general, the backlight unit is classified into an edge type and a direct type backlight units according to positions of fluorescent lamps. Although FIG. 10 shows an edge type backlight unit but the embodiments of the invention can be applied to an direct type backlight unit.

As shown in FIG. 10, the edge type backlight unit 1000 includes a reflective sheet 1010, a light source portion, a light-guiding plate 1040, a diffusion sheet 1020, a prism sheet 900, and a protection sheet 1030. The light source portion emitting light includes at least one fluorescent lamp 1060 and enclosures 1050 for receiving the fluorescent lamp 1060. The light source can include a cold cathode fluorescent lamp or a light emitting diode instead of the fluorescent lamp.

The enclosure 1050 receives the fluorescent lamp 1060 and reflects the light from the fluorescent lamp 1060. The light-guiding plate 1040 controls the light from the light source portion, evenly diffuses the light, and guides the diffused light to the display panel. The reflective sheet 1010 reflects the light from the light-guiding plate 1040 to the light-guiding plate 1040. The diffusion sheet 1020 diffuses or converges the light from the light-guiding plate 1040 and the reflective sheet 1010. The prism sheet 900 converges a portion of the light converged or diffused by the diffusion sheet 1020 to the protection sheet 1030, and reflects the remaining light to the light-guiding plate 1040. The prism sheet 900 is formed on the base portion 620 or the supporting portion 930, as shown in FIGS. 9A and 9B.

The protection sheet 1030 diffuses the light converged by the prism sheet 900 and provide the light to the display panel to widen a view angle of the display panel.

The direct type backlight unit (not shown) is different from the edge type backlight unit in that the fluorescent lamp is disposed between the diffusion sheet and the reflective sheet. Therefore it is unnecessary for the direct type backlight unit to have a light-guiding plate.

Figure 11:
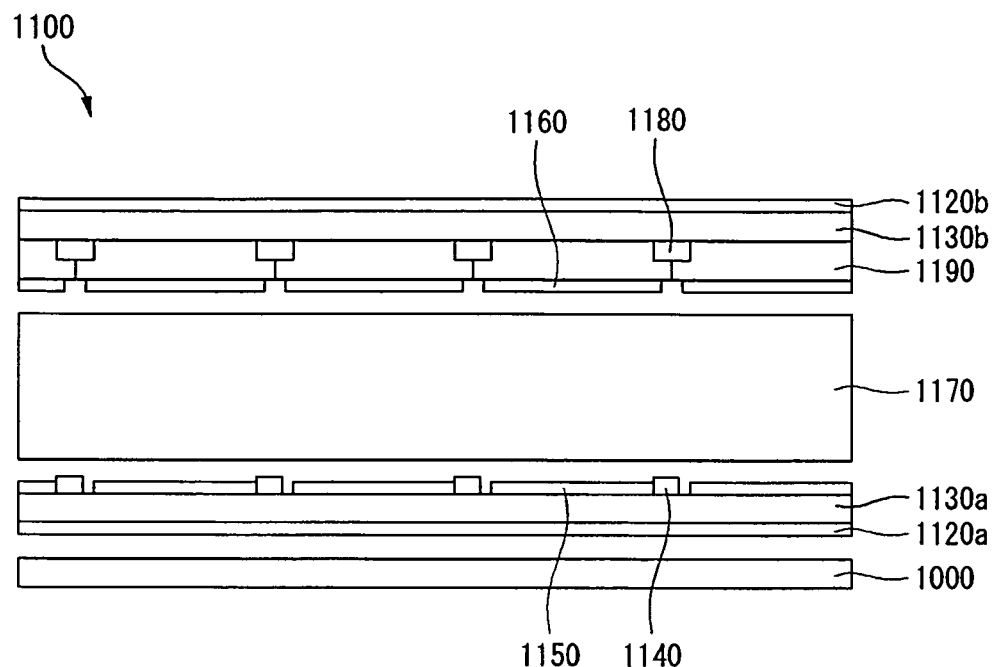
FIG. 11 is a sectional view showing a display device having the polarizer and the prism sheets according to embodiments of the invention.

FIG. 11 is a sectional view showing a liquid crystal display device 1100 having a backlight unit 1000 and a liquid crystal display panel. Referring to the FIG. 11, the liquid crystal display panel includes a lower polarizing film 1120a, an upper polarizing film 1120b, a lower glass substrate 1130a, an upper glass substrate 1130b, color filters 1190, black matrices 1180, a pixel electrode 1150, a common electrode 1160, a liquid crystal layer 1170 and a thin film transistor 1140.

The color filter includes a red color filter R, green color filter G and blue color filter B, and each color filter generates a corresponding color when the light is applied thereto.

The common electrode 1160 and pixel electrode 1150 align crystal molecules in liquid crystal layer 1170 according to the voltage applied from the external. The pixel electrode 1150 is switched by the thin film transistor 1140.

The liquid crystal layer 1170 includes lots of crystal molecules, and the axes of the crystal molecules are aligned in one direction by the difference voltage between the pixel electrode 1150 and the common electrode 1170. As a result, it is possible for the light from the backlight unit 1000 to be input to the color filters corresponding to molecular alignment of the liquid crystal. The backlight unit 1000 is disposed under the liquid crystal display panel and provides the light to the liquid crystal display panel.

The liquid crystal display device includes the polarizer, prism sheet and backlight unit using the optical film according to embodiments of the invention is described, but the invention is not limited to the liquid crystal display device. The scope of the embodiments of the invention covers a variety of display device including notebook computers, cellular phones, display screen of refrigerator, personal digital assistants, automated teller machines and so on.

Figure 12:
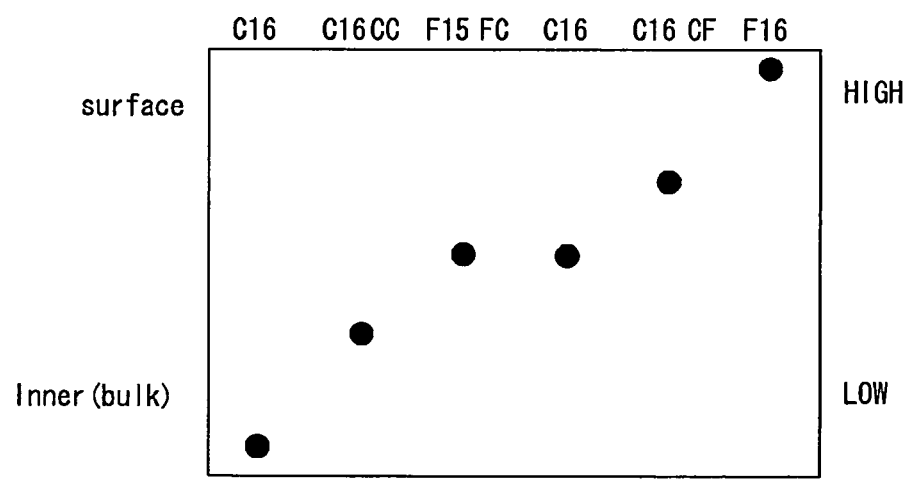
FIG. 12 is a graph showing the results obtained by analyzing a surface of the optical film according to embodiments of the invention.

FIG. 12 is a graph showing the results obtained by analyzing a surface of the optical film according to an embodiment of the invention. Specifically, FIG. 12 is a graph showing the content of carbon, oxygen, and fluorine based on the etched depth. Experimentation was executed by irradiating X-rays onto the surface of the optical film by using a mono X-ray gun. Table 2 shows the experimentation results regarding the content of carbon, oxygen, and fluorine according to the depth of the optical film obtained by irradiating X-rays onto the surface of the optical film.

TABLE 2

| Incident angle | Carbon | Fluorine | Oxygen |
| --- | --- | --- | --- |
| 23° | 42.77 | 42.35 | 14.89 |
| 83° | 31.54 | 63.81 | 4.65 |

In Table 2, the data analyzed (obtained) by irradiating x-rays at 23° with respect to a vertical direction to the optical film relatively represent atomic % of carbon, fluorine, and oxygen with respect to the bulk layer (inner layer), and the data analyzed (obtained) by irradiating x-rays at 83° with respect to a vertical direction to the optical film relatively represent atomic % of carbon, fluorine, and oxygen with respect to the surface.

Figure 13:
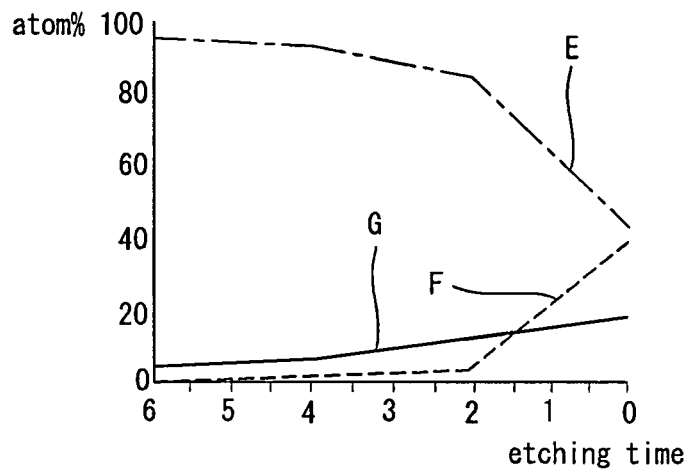
FIG. 13 is a graph showing content of carbon, oxygen, and fluorine of the optical film based on an etched depth according to embodiments of the invention.

The marks (shown in FIG. 12) indicate a concentration distribution of fluorine from the lower surface layer (the inner layer, the bulk layer) to the upper surface layer (surface) of the optical film, and it is noted that the density increases as it goes toward the surface of the optical film. With reference to FIG. 13, the atomic percents of carbon (F) and oxygen (G) increases gradually as the etching time is prolonged, while the atomic percent of fluorine (E) is high if the etching time is short. Resultantly, with reference to Table 2 and FIGS. 12 and 13, it can be noted that the content of fluorine of the optical films according to the embodiments of the invention increases as it goes toward the surface of the optical films.

Figure 14:
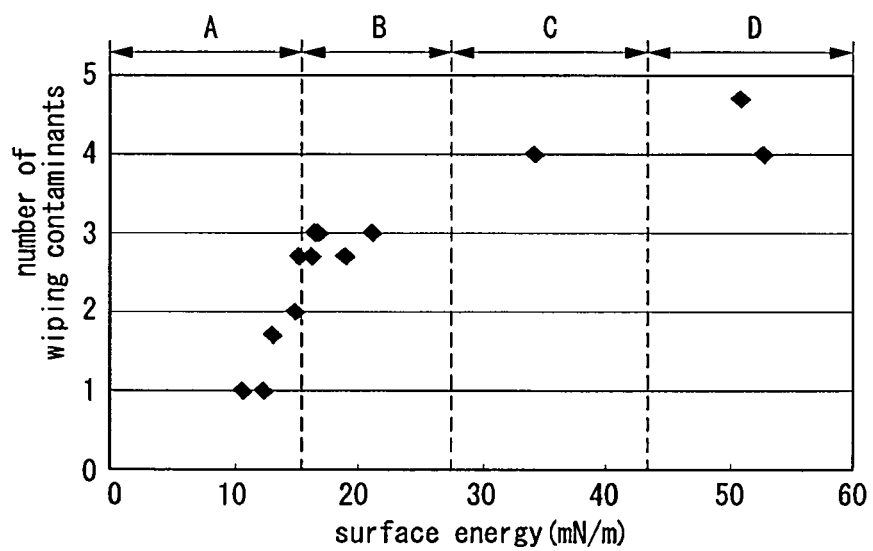
FIG. 14 is a graph showing the results obtained by performing contaminant removal test for the optical film according to embodiments of the invention.

FIG. 14 is a graph showing the results obtained by testing contaminant removal characteristics of the optical film performed such that contaminants attached on the optical film and can be easily wiped away. In FIG. 14, the horizontal axis indicates the surface energy (mN/m) and the vertical axis indicates the number of times of contaminant removal. The regions A and B indicate the cases of using the optical film according to the embodiments of the invention, and the regions C and D indicate the cases of using the related art optical film. The contaminant removal testing was performed by using tissue paper. As noted in FIG. 14, in case of using the optical film according to the embodiments of the invention for testing (i.e., the regions A and B), when the surface energy was smaller than 15 mN/m, the contaminant was removed within two times of wiping, and when the surface energy was in the range of about 15 mN/m to 28 mN/m, the contaminant was removed by two or three times of wiping. In contrast, in case of using the related art optical film for testing (i.e., the regions C and D), when the surface energy was in the range of 29 mN/m to 42 mN/m, the contaminant was not removed until at least four times of wiping, and when the surface energy was 43 mN/m or greater, the contaminant was only removed by at least four or five times of wiping. Therefore, it can be noted that the optical film according to the embodiments of the invention exhibits the remarkably improved contaminant removal characteristics compared with the related art optical film.

FIG. 15 is a graph showing the results obtained by testing anti-fouling characteristics of the optical film performed by intentionally attaching contaminants onto the optical film. In FIG. 15, the horizontal axis indicates the surface energy (mN/m) and the vertical axis indicates variation of light transmittance, and marks ■ indicate variation transmittance after contaminants are attached and marks ○ indicate variation transmittance after removal of the contaminants. The regions A and B indicate the cases of using the optical film according to the embodiments of the invention, and the regions C and D indicate the cases of using the related art optical film. In the anti-fouling characteristics testing, four lines of 1.5 centimeters were drawn with an oily pen and then wiped five times with polyester cloth. Here, the variation transmittance after the lines were drawn with the oily pen and the variation transmittance after the lines were wiped were obtained by the following mathematical equation:

Variation transmittance after the lines are drawn=
(transmittance before the lines are drawn−transmittance after the lines are drawn)/(transmittance before the lines are drawn)  [Equation 1]

Variation transmittance after lines are eliminated
(transmittance before the lines are eliminated−transmittance after the lines are eliminated)/(transmittance after the lines are eliminated)  [Equation 2]

As noted in FIG. 15, in case of using the optical film according to embodiments of the invention for testing (i.e., the regions A and B), when the surface energy was smaller than 15 mN/m, the variation transmittance after the lines were drawn and the variation transmittance after the lines were wiped were drastically reduced.

FIG. 16 is a view showing a table of test results of anti-fouling of the optical film according to embodiments of the invention and the related art optical samples. In FIG. 16, the sample 'A' was tested for its anti-fouling characteristics under the conditions that a difference value between contact angles of two materials constituting the optical film according to one embodiment of the invention in a solid state was 30° and a difference value between surface energies was 16 mN/m. Its level testing results were good (LV1) as shown in FIG. 16. The sample 'B' was tested for its anti-fouling characteristics under the conditions that a difference value between contact angles of two materials constituting the optical film according to another embodiment of the invention in a solid state was 25° and a difference value between surface energies was 12 mN/m. Its level testing results were good (LV1) as shown in FIG. 16. The sample 'C' was tested for its anti-fouling characteristics under the conditions that a difference value between contact angles of two materials constituting the optical film according to still another embodiment of the invention in a solid state was 20° and a difference value between surface energies was 8 mN/m. Its level testing results were good (LV2) as shown in FIG. 16. The sample 'D' shows a case of using the related art optical film which was tested under the conditions that a difference between contact angles of two materials constituting the optical film and a difference between surface energies were 0. The test results of the sample 'D' shows inferior anti-fouling characteristics (LV3) as shown in FIG. 16.

According to the configuration of embodiments of the invention, the material having the relatively high surface energy is largely distributed to the side of the mixture layer to be attached while the material having the relatively low surface energy is largely distributed to the opposite side on which a touching operation is performed. Thus, the surface energy value of the side of the optical film on which a touch is made can be reduced compared with the related art, and the surface energy of the attached side of the optical film can maintain a relatively high value, so that a contaminant cannot easily attach onto the surface of the display device by a touch or the like, and even if a contaminant is attached, it can be easily removed. Therefore, the optical film, the polarizer, the prism sheet, the backlight unit and the display device can be fabricated in a simple manner and have the improved anti-scratch, anti-fouling, and anti-reflection characteristics.

The optical film according to embodiments of the invention can be directly attached to the screen of the display device desired to be used, or can be integrally attached on the screen of the display device during the fabrication process. Therefore, the optical film according to embodiments of the invention can be used as a film for protecting the display screen or as a transparent film or the like for a touch panel.

It will be apparent to those skilled in the art that various modifications and variation can be made in embodiments of the invention without departing from the spirit or scope of the invention. Thus, it is intended that the embodiments of the invention cover the modifications and variations of this invention provided they come within the scope of the appended claims and their equivalents.

What is claimed is:

1. An optical film for a display device, comprising:
   a substrate; and
   a single coating layer in which a first material has a first range of surface energy value and a second material has a second range of surface energy value smaller than the first range of surface energy value such that the first material is mainly distributed on a first side of the coating layer contacting the substrate and the second material is mainly distributed on a second side of the coating layer opposite to the first side,
   wherein the second material includes a fluorine-based polymer having —$CH_2CF_3$ group.

2. The optical film according to claim 1, wherein a difference between the first range of surface energy value and the second range of surface energy is in a range of 5 mN/m to 35 mN/m.

3. The optical film according to claim 1, wherein the first material has a surface energy value in a range of 30 mN/m to 45 mN/m and the second material has a surface energy value in a range of 10 mN/m to 25 mN/m.

4. The optical film according to claim 1, wherein the substrate is one of a diffusion sheet, polarizer, display screen and a layer of a prism sheet.

5. The optical film according to claim 1, wherein the first material contains a polymer resin selected from ethyl acrylate polymer, ketyl acrylate polymer, butyl acrylate polymer, and ethyl hexyl acrylate poilymer.

6. The optical film according to claim 1, wherein the coating layer contains at least one of silica particles, nano-silica particles, conductor particles, and nano-conductor particles.

7. The optical film according to claim 1, further comprising an other coating layer on the coating layer, wherein the other coating layer includes a polymer resin.

8. The optical film according to claim 7, wherein the other coating layer further contains at least one of silica particles, nano-silica particles, conductor particles, and nano-conductor particles.

9. The optical film according to claim 1, wherein the first material contains a hydroxyl (—OH) group.

* * * * *